United States Patent [19]

Jakubek et al.

[11] 3,996,136
[45] Dec. 7, 1976

[54] PUMP-FILTER FOR BILGE WATER

[76] Inventors: Peter Jakubek, 48, Heinrich Collinstrasse, A-1140 Vienna; Karl Biswanger, Schottenfeldgasse 77, A-1070 Vienna, both of Austria

[22] Filed: Dec. 4, 1974

[21] Appl. No.: 528,938

Related U.S. Application Data

[63] Continuation-in-part of Ser. No. 342,252, March 16, 1972, Pat. No. 3,852,193.

[30] Foreign Application Priority Data

Nov. 15, 1974 France .............................. 74.37724

[52] U.S. Cl. .............................. 210/86; 210/73 W; 210/114; 210/124; 210/261; 210/262; 210/295
[51] Int. Cl.² ........................................ B01D 35/00
[58] Field of Search ............ 210/73 OW, 83, 84, 86, 210/114, 124, 125, 258, 261, 262, 264, 295, 296, 416 O, 513, 136, 265

[56] References Cited

UNITED STATES PATENTS

| | | | |
|---|---|---|---|
| 1,433,357 | 10/1922 | Ellis | 210/265 X |
| 1,505,841 | 8/1924 | Alexander | 210/73 OW |
| 1,985,435 | 12/1934 | Watson | 210/262 X |
| 2,027,876 | 1/1936 | Pennebaker | 210/416 O X |
| 2,048,140 | 7/1936 | Renfrew et al. | 210/21 X |
| 2,312,604 | 3/1943 | Thompson | 210/136 X |
| 2,348,167 | 5/1944 | Erwin | 210/73 OW |
| 3,291,309 | 12/1966 | Hutchison | 210/261 X |
| 3,306,447 | 2/1967 | Medeiros | 210/262 X |
| 3,339,736 | 9/1967 | Muller | 210/262 X |
| 3,565,252 | 2/1971 | Sheehy | 210/258 X |
| 3,606,017 | 9/1971 | Moore | 210/261 X |
| 3,679,053 | 7/1972 | Koulovatos et al. | 210/86 |
| 3,836,000 | 9/1974 | Jakubek | 210/258 X |

*Primary Examiner*—Charles N. Hart
*Assistant Examiner*—R. G. Mukai
*Attorney, Agent, or Firm*—Ernest G. Montague; Karl F. Ross; Herbert Dubno

[57] ABSTRACT

A housing for a bilge pump-filter has a lower part in which oil and like light pollutants are separated from the polluted water. A pump has its intake connected to the lower region of this lower part and its output connected to an upper compartment of a compensation chamber in the upper housing part which is subdivided by a filter into this upper compartment and a lower compartment. A funnel under the filter conducts liquid coming down through the filter by gravity to the lower region of the lower compartment and a drain at the upper region of this lower compartment off the filter water. A level detector in the lower separation chamber operates the pump only when liquid level in this separation chamber is above a predetermined minimum level.

7 Claims, 12 Drawing Figures

3,996,136

PUMP-FILTER FOR BILGE WATER

CROSS REFERENCE TO RELATED APPLICATION

This application is a continuation-in-part of our copending application Ser. No. 342,252 filed Mar. 16, 1972, now U.S. Pat. No. 3,852,193 issued Dec. 3, 1974.

FIELD OF THE INVENTION

The present invention relates to an apparatus for purifying a liquid. More particularly this invention concerns a bilge pump-filter for removing liquid and solid pollutants from bilge water so that this water can be pumped overboard.

BACKGROUND OF THE INVENTION

Various problems are involved in the purification of liquids which are polluted with oil or the like. The purification of polluted water is important for the protection for the environment, particularly of coated waters. A purification of water which has been contaminated with oil or the like is required, for instance, after an accident in which tankers are involved, and in connection with bilge-pumping and tank-flushing operations. Because suitable processes and apparatus were not available, the previous practice has been simply to pump contaminated water overboard. This has resulted in considerable water pollution.

All previously known devices for purifying liquids which are polluted with oil or the like have numerous disadvantages. The polluted liquid has been pumped through a filter in which the liquid was to be purified. Where such apparatus is used, the liquid handled in the pump was still polluted with oil or the like so that an emulsion was formed and the increased viscosity of the liquid to be handled required a higher pump power. Mechanical impurities contained in the liquid often resulted in trouble in the operation of the conventional apparatus.

OBJECTS OF THE INVENTION

It is therefore an object of the present invention to provide an improved apparatus for purifying a liquid containing a liquid contaminant or pollutant having a higher specific gravity than the polluted liquid.

Another object is the provision of an inexpensive system which allows such polluted liquid to be treated in such a manner that it can safely and legally be drained overboard.

Yet another object is to provide an improved apparatus for treating bilge water which operates automatically and presents little service difficulties.

A further object is to advance principles laid out in our above-cited copending patent application.

SUMMARY OF THE INVENTION

These objects are attained according to the present invention in a system wherein the polluted liquid is fed into a separation chamber in the bottom of a two-part housing where it undergoes a preseparation such that the liquid pollutant rises to the top of the liquid in this separation chamber. A pump has its intake connected to this separation chamber at a lower region thereof and has its output connected to an upper compartment of a compensation chamber above the separation chamber and subdivided into this upper compartment and a lower compartment by a filter. The liquid passes vertically down through this filter in the compensation chamber and is then withdrawn in a highly pure state from the lower compartment thereof. The pump is only operated when the liquid level in the separation chamber is above a predetermined minimum level.

The upper part of the housing according to this invention is screwed onto the lower part so that the filter can readily be changed simply by replacing this upper part containing the filter. To this end the conduit from the output of the pump to the upper compartment of the compensation chamber is provided with a snap coupling so as to permit the housing upper part readily to be disconnected and replaced.

The system according to the present invention is extremely simple yet very efficient. The preseparation in the separation chamber insures that the viscosity of the liquid passing though the pump and into the compensation chamber is reduced so that a small volume nonpositive-displacement pump can be used. It is possible with this system to purify bilge waters sufficiently to pump them overboard without any danger of polluting the neighboring waters.

The sensing means according to the present invention which operates the pump when the liquid level in the separation chamber is above a predetermined level comprises a reed switch fixed in this chamber and operated by a doughnut float having a magnet that rises and falls with the liquid level and operates this switch to shut down the pump when it falls to a predetermined level. The reed switch is provided in a sealed vertical tube surrounded by the doughnut float.

BRIEF DESCRIPTION OF THE DRAWING

The above and other objects, features, and advantages will become more readily apparent from the following with reference to the accompanying drawing in which.

SPECIFIC DESCRIPTION

Figure 1:
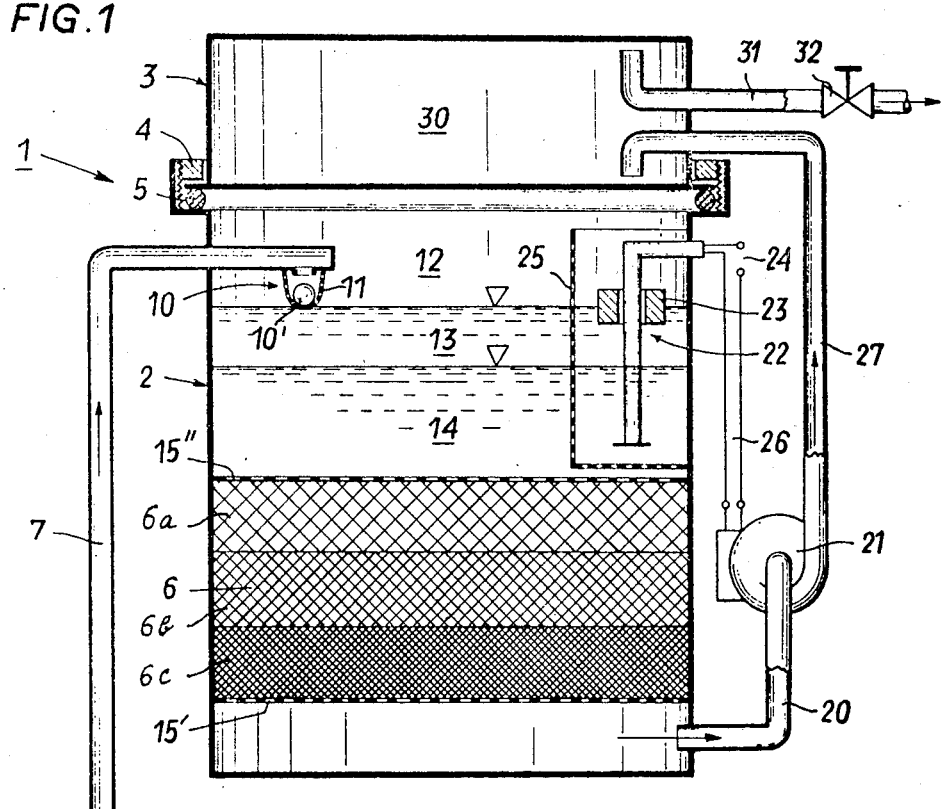
FIGS. 1, 2 and 3 are vertical sectional views partly in diagrammatic form illustrating purifying systems in accordance with the invention.

Whereas the apparatus which are shown in the drawing and will be described more fully hereinafter are intended to purify bilge water which is polluted with oil or the like, it is emphasized that the invention is by no means restricted to the purification of bilge water.

The apparatus 1 shown in FIG. 1 comprises a housing 2 and a cover 3. The cover 3 is connected by a screw-threaded ring 4 to the housing 2. An O-ring 5 is inserted between the cover 3 and the housing 2.

A filter 6 is disposed between perforated plates 15' and 15'' in the housing 2. The filter consists of three layers 6a–c of open-pore foam The size of the pores in the layer decreases from top to bottom, in the direction in which the liquid flown through the filter 6. The filter material may basically consist of any synthetic-resin material which absorbs oil. Such materials include plastic materials based on polyesters which are cross-linked with isocyanates, diamines or glycols, or on polyesters, polyurethanes, polyisocyanates, as well as polytetrafluoroethylene. Above the filter 6 the housing 2 contains an antechamber 12 which in this embodiment serves also as a separating chamber. An intake conduit 7 opens into the antechamber 12. The other end of the intake conduit 7 opens at a bilge 16 and is provided with a suction head 8, which can be shut off by a ball valve. A valve ball 9 of the ball valve is held in a wire cage 11 and closes the suction head 8 when the bilge 16 is about to be emptied. When the bilge 16 contains a sufficient amount of water which is polluted with oil or the like, the valve ball 9 floats up to unblock the opening in the suction head 8. That end of the intake conduit 7 which opens in the antechamber is provided with a check valve 10. The check valve 10 comprises a valve ball 10', which is held in a wire cage 11. The check valve 10 prevents a flow of liquid from the antechamber 12 through the conduit 7, for instance, when the apparatus 1 is inclined as a result of a rolling motion of the boat. The check valve 10 prevents an evaporation of water from the antechamber 12.

The antechamber 12 also contains a float-controlled magnetic switch 22, which comprises a float 23 which floats on an oil layer 13 which is superimposed on a water layer 14. The float-controlled magnetic switch 22 is surrounded by a grid 25 which prevents damage to the switch 22 during a cycling of the filter 6 and which damps fluctuations of the liquid level in the antechamber.

A conduit 20 which connects the housing and a centrifugal pump 21 opens between the lower perforated plate 15' and the bottom of the housing 2. The water from which oil or the like and mechanical contaminants have been removed is discharged by the centrifugal pump 21 through an additional connecting conduit 27 into an equalizing chamber 30, which is provided in the cover 3. From the equalizing chamber 30, purified water flows out of the apparatus through a discharge conduit 31, which may lead overboard. The discharge conduit 31 comprises a throttle valve 32 for adjusting the rate at which liquid is handled by the apparatus.

When the bilge 16 is almost empty, some air enters the antechamber 12 before the valve ball 9 finally closes the suction head 8. As a result, the liquid level in the antechamber 12 gradually subsides. When the liquid in the antechamber 12 has subsided below a predetermined level, the float-controlled magnetic switch 22 interrupts the supply of current from a current source 24 through electric leads 26 to the motor of the centrifugal pump 21. This may also be accomplished by a relay. When the centrifugal pump 21 has been de-energized, the equalizing chamber 30 is emptied through the conduit 27, the centrifugal pump 21, and the conduit 20 into the interior of the housing 2. The water which flows back through the filter 6 into the antechamber 12 entrains loosely held oil droplets from the filter so that the filter is automatically cleaned. At the same time, the float-controlled magnetic switch 22 in conjunction with the equalizing chamber 30 ensures that the filter 6 and the centrifugal pump 21 are always filled with water and the apparatus 1 always remains ready for operation, even if the valve ball 9 at the suction head 8 does not operate properly and much air enters the antechamber 12.

To minimize the overall height of the apparatus 1, the conduits 27 and 31 opening into the equalizing chamber have ends which are turned down and up, respectively so that the volume which is available in the cover 3 is fully utilized. The volume of the equalizing chamber must be at least as large as the effective volume of the antechamber 12. The effective volume of the antechamber 12 is determined by the uppermost and lowermost liquid levels in the antechamber 12, which levels are respectively determined by the check valve 10 and the float-controlled magnetic switch 22.

Figure 2:
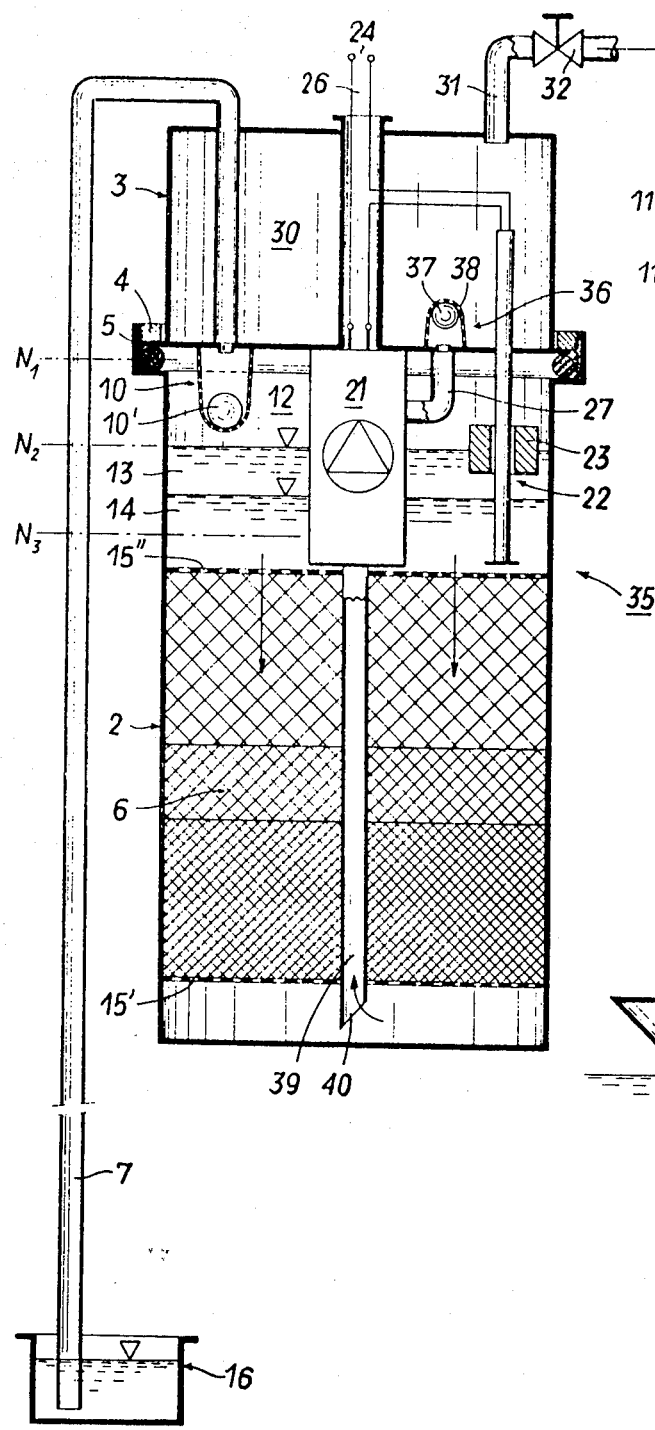

The apparatus 35 shown in FIG. 2 has basically the same design as the apparatus 1 of FIG. 1. In the embodiment of FIG. 2, however, the pump is disposed inside the housing 2. In this embodiment, all conduits extend through the cover 3, and the pump 21, the float-controlled magnetic switch 22 and the upper perforated plate 15'' as well as a suction pipe of the pump are carried by the cover. The suction pipe of the pump extends through the filter 6 and terminates below the lower perforated plate 15'. In the apparatus 35, the filters 6 may be exchanged in a quick operation. It is sufficient to loosen the screw-threaded ring 4, pull down the housing 2 containing the filter 6, and replace it with a new filter with its housing. Because the suction pipe 39 has a pointed lower end portion 40, a bore for receiving the suction pipe 39 need not be provided in the filter 6, which is simply pierced by the suction pipe 39. This ensures also a snug contact between the filter 6 and the suction pipe 39. The apparatus 35 has the same mode of operation as the apparatus 1. When air enters through the intake conduit and the liquid in the antechamber 12 subsides below a predetermined level, the float-controlled magnetic switch 22 de-energizes the centrifugal pump 21 whereupon the equalizing chamber is emptied down through the conduit 27, the centrifugal pump 21, and the suction pipe 39, and up through the filter 6 into the antechamber 12. Emptying of the antechamber 12 through the intake conduit 7 is prevented also in the apparatus 35 by the check valve 10. Because the filter 6 and the centrifugal pump 21 are always filled with water, the apparatus 35 is always ready for the operation. In order to prevent evaporation of water from the apparatus even after a prolonged shutdown and in the case of high ambient temperatures, a vapor trap or lock 36 is provided at that end of the connecting conduit 27 which opens into the equalizing chamber 30. The vapor lock 36 comprises a valve ball 37, which is movable in a screen cage 38 and whose mass is such that the ball just floats in the water in the equalizing chamber 30. Because the valve ball 37 just floats in the water, the ball does not prevent flow out of the equalizing chamber 30 through the conduit 27. During the operation of the apparatus, this flow is promoted by the vacuum which prevails in the antechamber 12 over the liquid. When the equalizing chamber 30 has been completely emptied, the valve ball 37 is seated on the opening of the connecting conduit 27 and prevents evaporation of the water contained in the container 2 and the centrifugal pump 21.

Before the apparatus 35 is put into operation it is filled with water to an upper level N1 in the antechamber 12. When polluted water is sucked from the bilge 16, air first flows from the intake conduit 7 into the antechamber 12 so that the liquid assumes an intermediate level N2 therein. This is the normal liquid level during the operation of the apparatus 35. When the handling of water from the bilge 16 is almost terminated and air is again aspirated, the liquid level drops and the magnetic switch 22 de-energizes the centrifugal pump 21 when the liquid has reached a lower level N3. When the centrifugal pump 21 has been de-energized, water flows from the equalizing chamber 30 into the antechamber 12 and the liquid in the latter rises to the level N1, as has been mentioned above. For this reason, the volume of the equalizing chamber is at least as large as the effective volume of the antechamber 12 between the levels N1 and N3.

Figure 3:
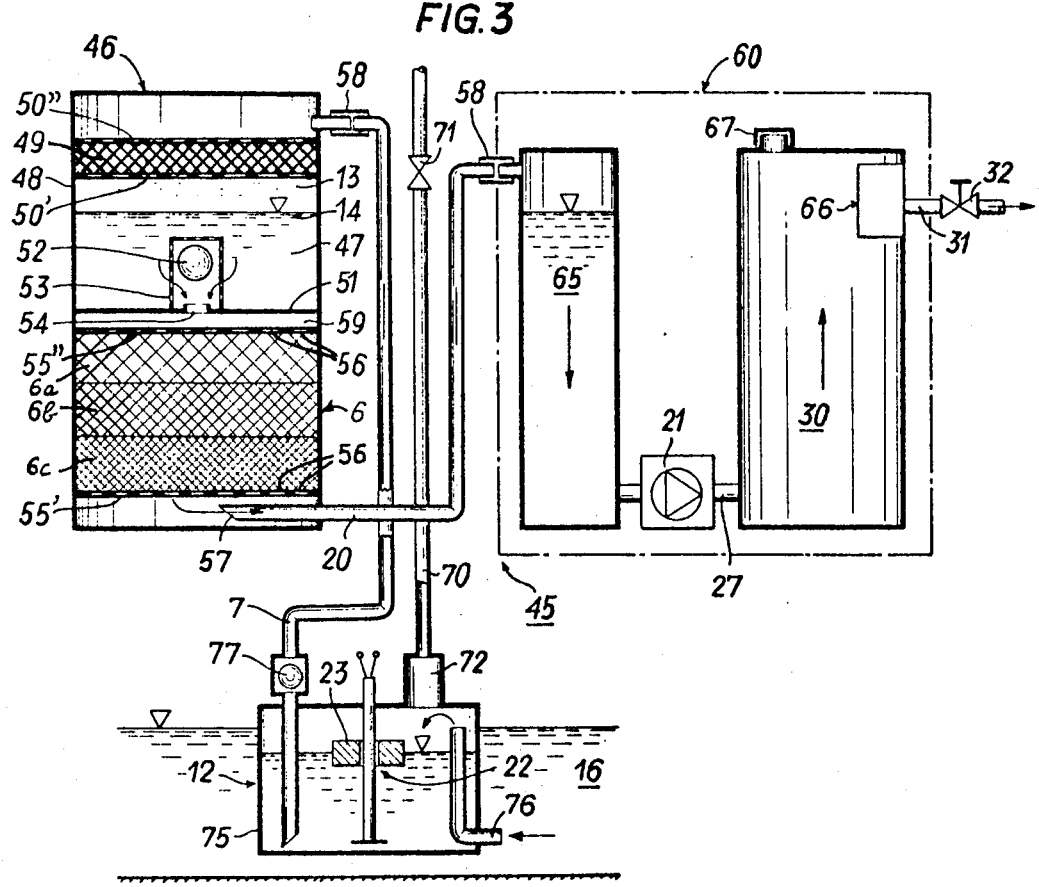

The apparatus 45 which is diagrammatically shown in FIG. 3 serves to purify bilge water which is polluted wit oil or the like. comprises three sections, namely, the antechamber 12, a section 46 comprising a separating chamber 47 and the filter 6, and a section 60 which comprises a chamber 65, the pump 21, and the equalizing chamber 30. Because the unit 46 comprising the filter 6 can easily be exchanged, the apparatus 45 can be adapted in a simple manner to different operating conditions, such as different kinds of oil or water to be handled. The antechamber 12 is arranged in the bilge 16 and is connected to the section 46 by the suction conduit 7, which incorporates a check valve 77 and is connected to the section 46 by a snap coupling 58 so that quick disconnection and connection is possible. The antechamber 12 can be vented through a conduit 70 which is adapted to be closed by a shut-off valve 71 which is open when the apparatus 45 is inoperative. The openging 72 of the venting conduit 70 in the antechamber 12 is enlarged in diameter in order to prevent clogging of this conduit by oil or the like which may splash up. The antechamber 12 is connected to the bilge 16 by an inlet pipe 76 which extends pressure-tight through the antechamber housing 75. The outer opening of the inlet pipe 76 may be provided with a filter and is disposed slightly over the bottom of the housing 75. The inlet pipe 76 extends upwardly in the antechamber 12 and opens slightly below the upper wall of the housing 75. The float-controlled magnetic switch 22 provided with the float 23 in the housing 75.

The section 46 comprises a housing 48 which in its upper portion accommodates the separating chamber 47 and in its lower portion accommodates the filter 6. The separating chamber 47 is closed at its top by a damping layer 49, which consists, e.g. of coarse-pore foamed synthetic-resin material. The damping layer 49 is disposed between perforated plates 50' and 50''. The upper perforated plate 50'' is spaced from the top of the housing 48. The suction conduit 7 opens in the container 48 in the space between the perforated plate 50'' and the top of the housing 48. The separating chamber 47 contains an upper oil layer 13 and a lower water layer 14 and is separated by a partition 51 from the space 59 which accommodates the filter 6. Liquid flows from the separating chamber 47 into the space 59 through an opening 54 which is provided in the partition 51. The opening 54 is provided witn a shut-off valve consisting of a densimetric valve ball 52, which is guided in a cage 53. The density of the ball 52 is such that it floats on water and sinks in oil so that the valve ball 52 drops with the interface between the oil 13 and the water 14 and closes the opening 54 when the oil layer 13 fills the separating space 47 down to the partition 51.

The filter 6 in the space 59 is carried between two perforated plates 55' and 55''. The size of the holes 56 in these plates decreases and their spacing increases from the edge toward the center. This ensures a uniform flow through the filter although water can flow only through the opening 54 from the separating chamber into the filter space 59. For the same reason, the opening 57 of the connecting conduit 20 is disposed approximately at the center of the lower perforated plate 55. As is indicated in the drawing, the filter 6 consists of three layers 6a, 6b and 6c whose porosities decrease from top to bottom. The filter materials may be used which have been mentioned in connection with the apparatus 1 and 35.

As has been mentioned, the third section 60 comprises the centrifugal pump 21, the equalizing chamber 30, and another chamber 65, disposed between the section 46 and the pump 21. In this case also , the conduit 20 from the section 46 is connected to the section 60 by a snap coupling 58. The chamber 65 serves to collect air which during changing of the filter has entered the connecting conduits. When air enters the centrifugal pump 21, the discharge of water through the apparatus is interrupted. The equalizing chamber 30 is connected to the centrifugal pump 21 by the connecting conduit 27 and has at its top a filling opening 67, which can be closed and a vapor lock 66 at the inlet for the discharge conduit 31 for purified water. An adjustable throttle valve 32 is again provided in the discharge conduit 31.

Figure 4:
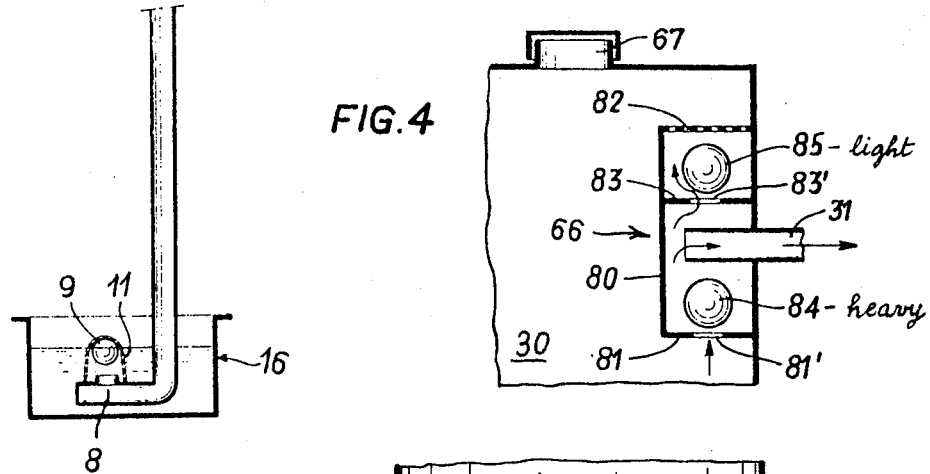
FIGS. 4 and 5 are sectional large-scale views of details of FIG. 3.

The design of the vapor lock 66 is shown more fully in FIG. 4. The vapor lock 66 comprises a cylindrical housing 80 which has a bottom 81, a screen 82 at its top, and a partition 83. The bottom 81 has a hole 81' and the partition has a hole 83'. These holes can be closed by ball valves 84 and 85, respectively. The discharge conduit 31 opens in the cylindrical housing between the bottom 81 and the partition 83. The valve ball 84 is steel. The valve ball 85 is made of synthetic-resin material.

The vapor lock 66 operates as follows: During normal operation of the apparatus 45 water flows from the equalizing chamber 30 through the opening 81', lifts the valve ball 84, and passes out through the conduit 31. When the water-treatment operation is interrupted, the vacuum in the section 46 and the chamber 65 is eliminated and air and/or water is sucked through the antechamber 30. Air and/or water then flows through the vapor lock 66 and lifts the valve ball 85 to flow into the equalizing chamber 30. If evaporation of water causes a superatmospheric pressure in the apparatus 45, particularly in the equalizing chamber 30, the valve ball 85 will be forced against the opening 83' and no water vapor can escape from the equalizing chamber 30. Only under much higher pressures is the steel ball 84 lifted so that this valve ball acts as a relief valve. Hence, the vapor lock 66 ensures that the apparatus 45 is always ready for operation because water cannot evaporate therefrom.

Figure 5:
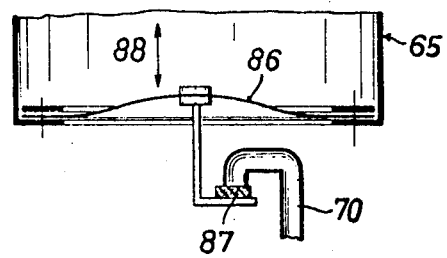

The shut-off valve 71 in the venting conduit 70 may be a solenoid valve which is connected to close the venting conduit 70 when the drive motor of the centrifugal pump 21 is energized. Alternatively, the shut-off valve 71 may be controlled by the vacuum in the apparatus 45. Such an arrangement is shown in FIG. 5. A diaphragm 86 to which a valve member 87 is secured and attached to the bottom of the chamber 65. When the vacuum in the chamber 65 increases during the operation of the apparatus 45, the diaphragm 86 is deflected in the direction of the arrow 88 and the valve member 87 is forced upwardly against the opening of the venting conduit 70. A tight seal of the valve member 87 is assisted by the vacuum in the conduit 70.

Figure 6:
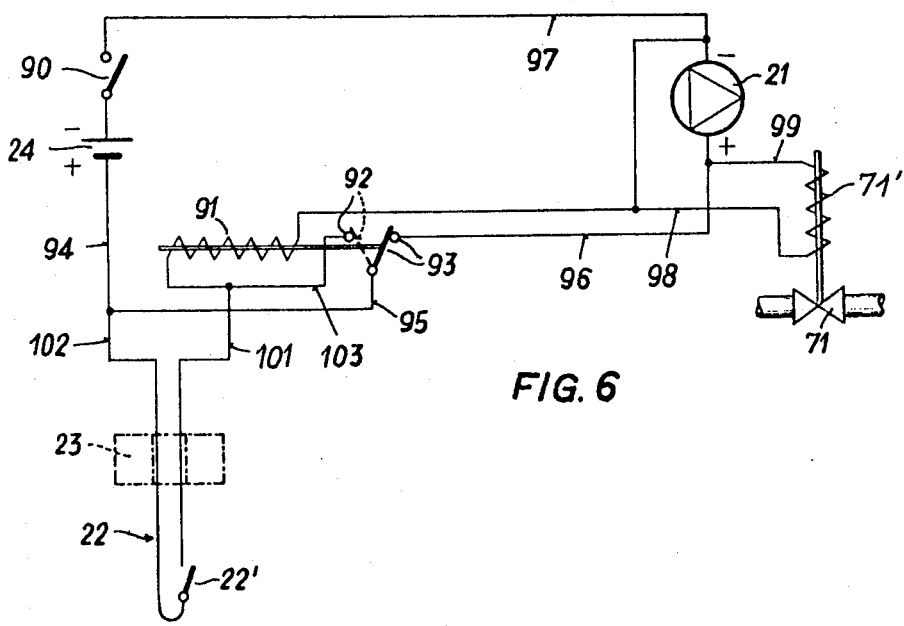
FIG. 6 is a circuit diagram of the assembly shown in FIG. 3.

FIG. 6 shows a circuit diagram of the electric components of the apparatus 45. The electric components comprise essentially an electric power source 24, a master switch 90, the float-controlled magnetic switch 22, and a relay 91. When the relay 91 is de-energized, its pole piece lies against a back contact 93. Unless the float 23 is adjacent to the reed switch 22' of the float-controlled magnetic switch 22, the contacts thereof are open and the relay remains de-energized. When the master switch 90 is now closed, the motor of the pump 21 is connected to the source of current 24 by the leads 91, 94, 95, and 96. At the same time, current flows through the leads 98 and 99 and the solenoid 71' of the shut-off valve 71, which solenoid 71' is conncted in parallel to the motor of the pump 21. As a result, the valve 71 is closed. When the liquid level in the antechamber 12 then drops, the float 23 of the float-controlled magnetic switch 22 will also drop and when the same is adjacent the contacts 22' the latter are closed and the relay is energized through leads 94, 102, 101, 100, and 97. The relay then moves its pole piece against contact 92 so that the leads 95 and 96 are disconnected from each other, the pump 21 and the shut-off valve 71 are de-energized, and the purification of liquid is interrupted. To prevent undesired starting of the apparatus in response to a rise of the liquid level in the antechamber 12, the relay is connected across the source 24 by leads 103, 95 and 94 and 100 and 97 when the pole of the relay 91 lies against contact 92. Hence, the relay does not open until the main switch 90 is opened.

Figure 7:
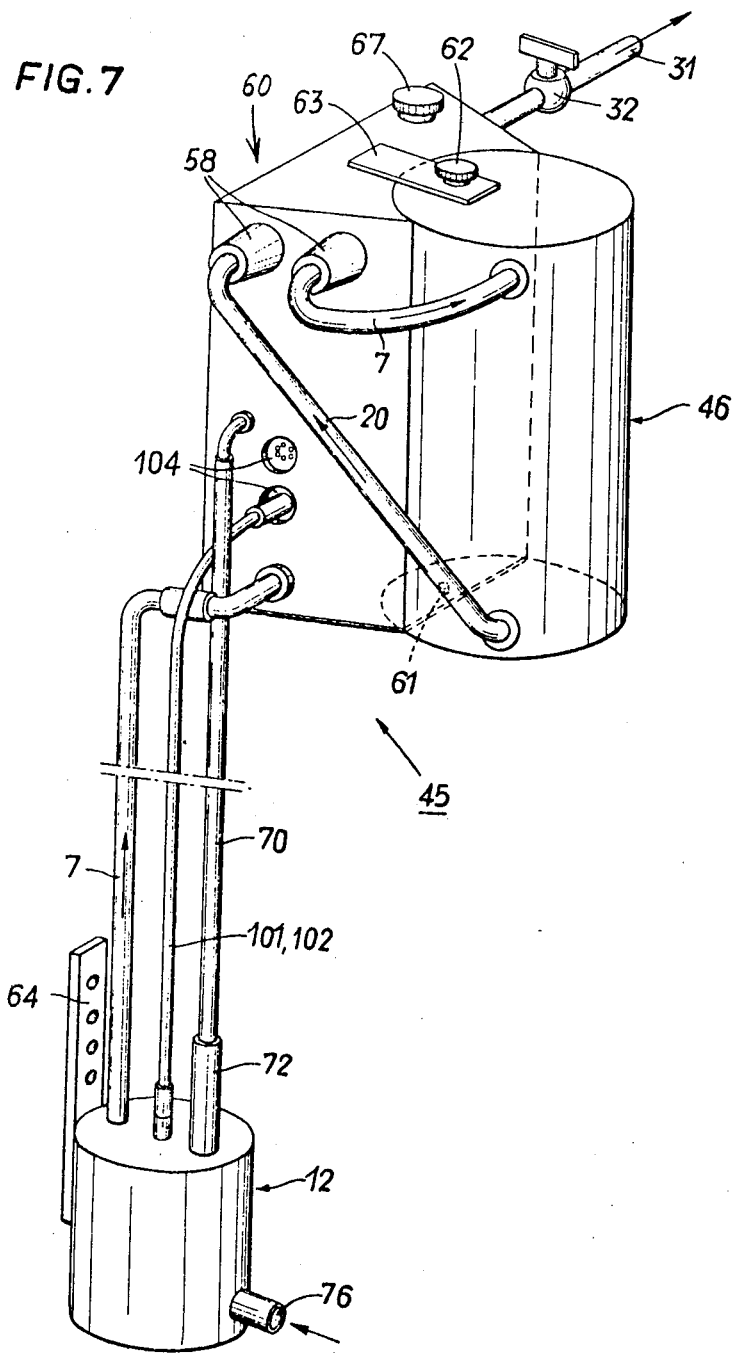
FIG. 7 is a persective view of the apparatus of FIG. 3.

FIG. 7 is a perspective view showing an actual embodiment of the apparatus 45. The antechamber 12 is provided with a mounting plate 64 for securing the apparatus in a bilge 16. The unit 60 is made as a sheet metal box and can be connected to the unit 46 so that the latter is carried by the unit 60. The unit 60 may be mounted at any desired location, e.g., placed on the deck or secured to a rib. To connect the units 60 and 46, a pin 61 provided on the underside of the housing of unit 60 is inserted into an aperture at the bottom of the container 48 of the unit 46 and this container 48 is then locked in position by a set screw 62 which is secured by a strap 63 to the housing of the unit 60. When the set screw 62 has been loosened and the quick couplings 58 have been disconnected, the unit 46 can be removed from the unit 60 and replaced by a new one. The housing of the unit 60 is also provided with plug contacts 104 for connecting the electric leads for controlling the apparatus and for the leads 101 and 102 leading to the float-controlled magnetic switch 22 in the antechamber 12. It is also apparent from FIG. 7 that the conduit 7 extends in part inside the unit 60.

The apparatus 45 is put into operation as follows: The unit 46 is first filled with water through the filling opening 67, the equalizing chamber 30, the centrifugal pump 21, the chamber 65 and the conduit 20. The unit 46 is then secured to the unit 60 and the quick couplings 58 are connected. The electric leads are then connected to the plug contacts 104 and the apparatus 45 is ready for operation. Any air in conduits 7 and 20 will not create any difficulty because it will collect above the damping layer 49 in the unit 46 or in the chamer 65 of the unit 60 and cannot enter the pump 21. The unit 60 need not be refilled each time filter 6 is changed because the conduits 20 and 7 are connected to the housing of the unit in the upper part thereof so that no water will drain out. The antechamber 12 disposed in the bilge 16 is not filled until the liquid in the bilge rises above a predetermined level. This arrangement prevents an uneconomical starting of the apparatus when there is only a little water in the bilge. On the other hand, the bilge can be pumped out entirely because the inlet pipe 76 is near the bottom of the bilge. When the antechamber 12 is filled and the master swtich 90 is operated, the pump 21 will start and the shut-off valve 71 will close so that water which is polluted with oil and the like flows from the bilge through the antechamber 12 and the conduit 7 into the unit 46. As the water flows through the damping layer 49, coarse impurities are retained and turbulence in the separating chamber 47 is avoided. A coarse separation into an oil layer 13 and a water layer 14 is effected in the separating chamber 47. Water which has a small residual oil content flows out of the unit 46 through the opening 54 in the partition 51, the filter 6 and the conduit 20. The water which has been purified flows off through the chamber 65 and the centrifugal pump 21, the conduit 27, the equalizing chamber 30 and the discharge conduit 31 The rate of flow of the water can be controlled in a simple manner with the throttle valve 32 in the dishcarge conduit 31. When the bilge 16 has been pumped out entirely the liquid level in the antechamber 12 will drop and when the liquid has dropped below a predetermined level the magnetic switch 22 will de-energize the pump 21 to interrupt the treatment operation. Because there is a vacuum over the filter 6, water from the equalizing chamber 30 is sucked back through the pump 21 and the chamber 65 into the unit 46 so that the filter is automatically cleaned and entry of an excessive amount of air from the antechamber 12 into the separating chamber 47 is avoided. In this operation, some air from the chamber 65 is entrained so that the air cushion in the latter cannot increase beyond a certain size. The master switch is now opened to de-energize the apparatus, which can be put into operation again when the antechamber 12 has been refilled and the master switch is closed. When the oil layer 13 in the separating chamber 47 fills the latter to the separating wall 51, the valve ball 52 automatically prevents an overflow of oil into the filter 6 so that even when the apparatus is not supervised, oil or the like cannot pass through the filter 6 and overboard. When the flow of liquid through the unit 46 is interrupted, a further separation of oil and water is effected and as a result of this separation any water particles enclosed in the oil layer 13 may settle down so that the oil layer is somewhat thinned. A large amount of oil will not enter the filter 6 when the purification of liquid is then resumed.

Figure 8:
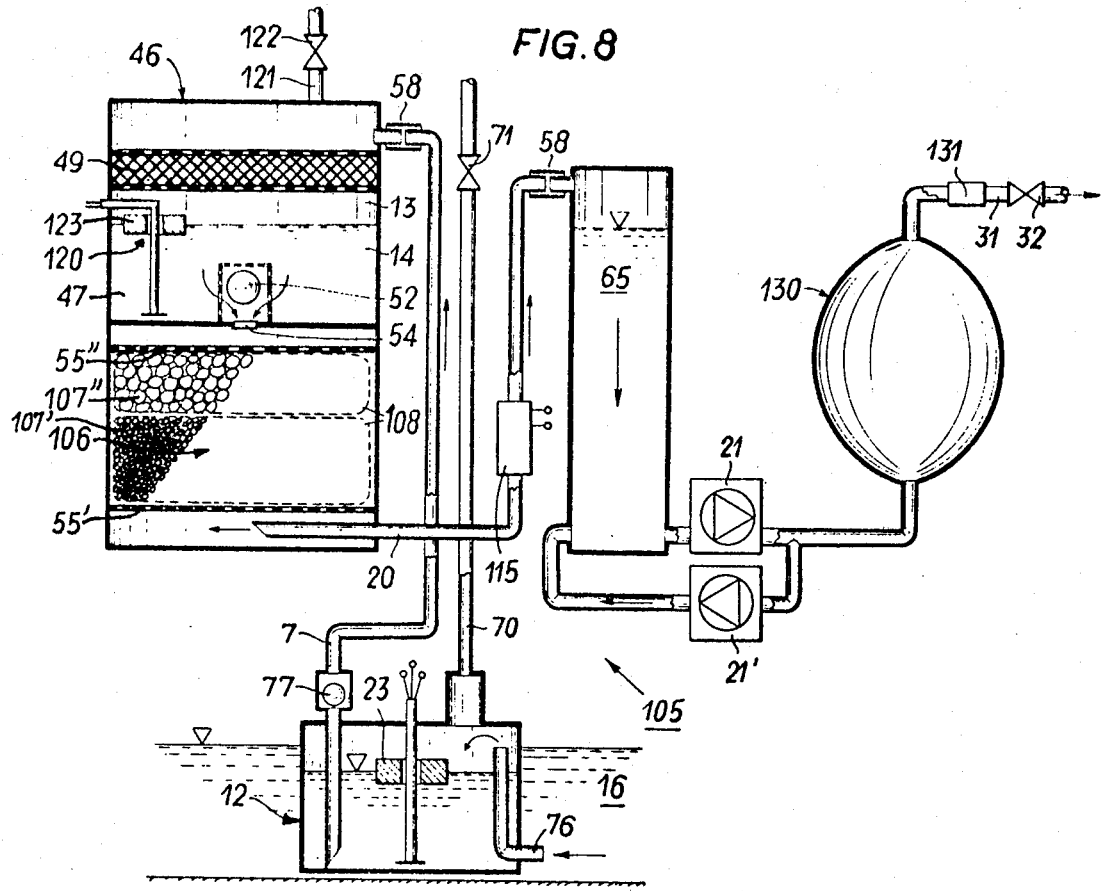
FIG. 8 is a vertical sectional view partly in diagrammatic form illustrating another purifying system of this invention.

The apparatus 105 which is diagrammatically shown in FIG. 8 is set up for fully automatic operation. The antechamber 12 is designed like that in the apparatus 45 with the exception that the float-controlled magnetic switch is a two-position switch so that the apparatus can be started when the liquid in the antechamber 12 reached a predetermined level. The unit 46 is also designed like the unit 46 of the apparatus 45 and is additionally provided with a float-controlled magnetic switch 120 in the separating chamber 47 and an oil drain 121 provided with a shut-off valve 122 and controlled by the switch 120. The filter in the unit 46 may be of the kind which has been described in connection with the apparatus 35. Alternatively, as is indicated in FIG. 8, the filter may consist of a filter layer 106 of balls 107' and 107'' made of polytetrafluoroethylene. The filter layer 106 is also carried between perforated plates 55' and 55'' and in the embodiment shown by way of example has two layers of balls which differ in diameter. The upstream, upper balls 107'' are larger than the lower balls 107'. The filter layer 106 can easily be changed as the balls 107' and 107'' are held in nets 108.

A vacuum switch 115 is incorporated in the conduit 20 between the unit 46 and the chamber 65 and deenergizes the pump when the valve ball 52 has interrupted the flow of liquid from the separating chamber 47 through the opening 54 into the filter chamber.

The equalizing chamber may be designed like the equalizing chamber 30 of FIG. 3 an be provided with the vapor lock 66 described in connection therewith. Alternatively, the equalizing chamber may be defined by expansible body 130, which may be similar to a football bladder. If the equalizing chamber is defined by an expansible body 130, the vapor lock may consist of a simple check valve 131 which opens in the direction in which water is discharged. The check valve may consist, e.g., of a spring-loaded ball valve. When the apparatus has been deenergized and the vacuum upstream of the filter and in the chamber 65 vauses water to flow back through the pump 21 into the unit 46, the volume of the container 130 is decreased. The container will reexpand when the purification of water is resumed. When so much oil has been collected in the separating chamber that the latter is entirely filled by the oil layer 13, the densimetric valve ball 52 closes the opening 54 and the dicharge of liquid is interrupted. At the same time, the densimetric float 123 has reached the lower contacts of the float-controlled magnetic switch 120 so that the latter causes the valve member 122 in the oil drain 121 to be opened and also deenergizes the pump 21 and energizes another centrifugal pump 21', which discharges in the opposite direction. The centrifugal pump 21' supplies water from the equalizing chamber 130 through the chamber 65 and the filter 105 into the separating chamber 47 so that oil is forced out of the unit 46 through the oil drain 121. When the interface between the oil layer 13 and the water layer 14 has risen so that the float 123 operates the upper contacts of the float-controlled magnetic switch 120, the pump 21' is de-energized an th pump 21 is energized and the shut-off valve 122 is closed. The normal purification of water is now resumed. Instead of the two centrifugal pumps 21, 21', a reversible pump for handling water in both directions may be connected between the chamber 65 and the equalizing chamber 130.

Figure 9:
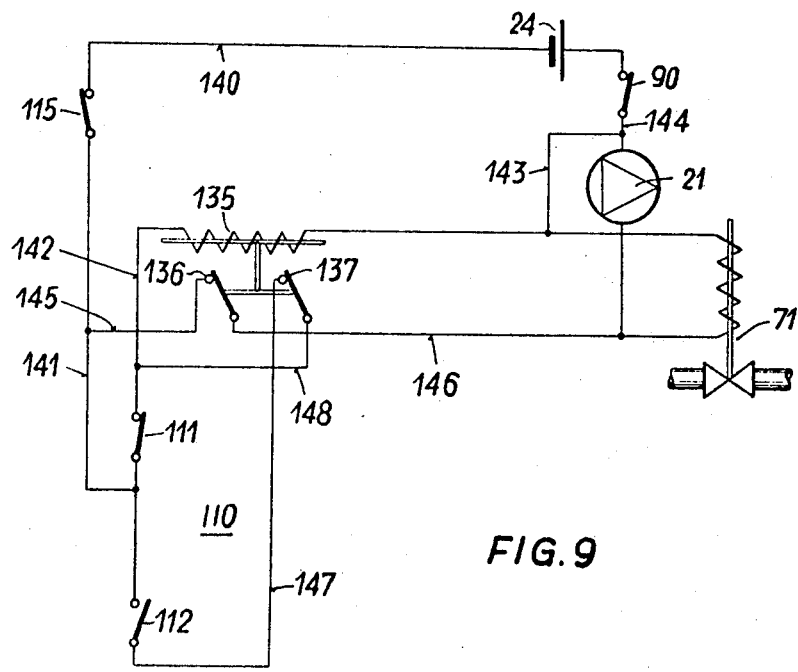
FIG. 9 is a circuit diagram of the control circuit for the system of FIG. 8.

The electric components of the apparatus 105 are shown in FIG. 9. For the sake of clarity, the circuits by which the float-controlled magnetic switch 120 controls a forcing of oil out of the separating chamber 47 have been omitted. The float-controlled magnetic switch 110 in the antechamber 12 has two sets of contacts. The upper contacts 111 close as the float approaces. The lower contacts 112 open as the float approaches. When the master switch is closed and the vacuum switch 115 is also closed during normal operation current flows from the source of current 24 through leads 140, 141, the contacts 111 of the float-controlled magnetic switch 110, which contacts are closed when the antechamer 12 is filled, the lead 142 and the relay 135, and back through leads 143 and 144 to the source 24. The contacts 136 and 137 of the relay are closed when the same is energized so that the pump 21 is energized through leads 140, 145, contacts 136, and leads 146 and 144. At the same time, voltage is applied to the solenoid valve 71, which is connected in parallel to the pump 21 and is then closed. Together with the liquid in the antechamber 12, the float 23 will subside so that the contacts 111 of the float-controlled magnetic switch 110 open. The relay 135 is now energized through the still closed contacts 112 and the lead 147, the switch contact 137 of the relay 135 and the leads 149 and 142 so that the contacts 136 of the relay 135 remain closed and the pump 21 continues to operate. Only when the float 23 reaches the lower contacts 112 of the float-controlled magnetic switch 110 are these contacts opened and the relay 135 drops out and the motor of the pump 21 and the solenoid of the solenoid valve 71 are deenergized. When the liquid level in the antechamber 12 rises again until the float 23 has reached the upper contacts of the float-controlled magnetic switch 110, the contacts 111 are closed and the operation of the apparatus is automatically resumed.

Figure 10:
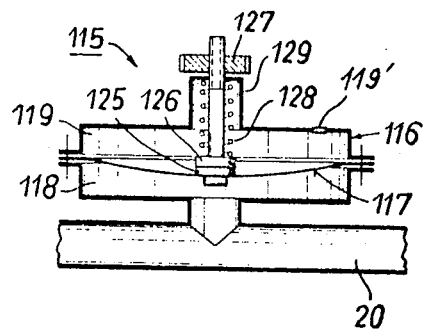
FIGS. 10 and 11 are sectional large-scale views of details of FIG. 8.

FIG. 10 shows by way of example an embodiment of the vacuum switch 115 which is incorporated in the conduit 20 between unit 46 and chamber 65. A diaphragm 117 divides the housing 116 of the vacuum switch 115 into two chambers 118 and 119. The chamber 118 communicates with the connecting conduit 20. The chamber 19 communicates with the outside atmosphere through a orifice 119'. The diaphragm 117 carries at its center a contact 125. A second contact 126 is displaceably mounted in the housing 116. The extent of the displacement may be adjusted by a nut 127. In response to a vacuum in the conduit 20 and chamber 118, the diaphragm 117 is deflected. A spring 128 holds the contact 126 against the contact 125 until the nut 127 engages a stop 129 fixed to the housing. In response to yet higher vacuum in the conduit 20, the contacts open to deenergize the pump 21 so that the apparatus 105 is shut down. In response to a pressure rise in conduit 20, the contacts 125 and 126 are closed again so that the purification of water is resumed.

Figure 11:
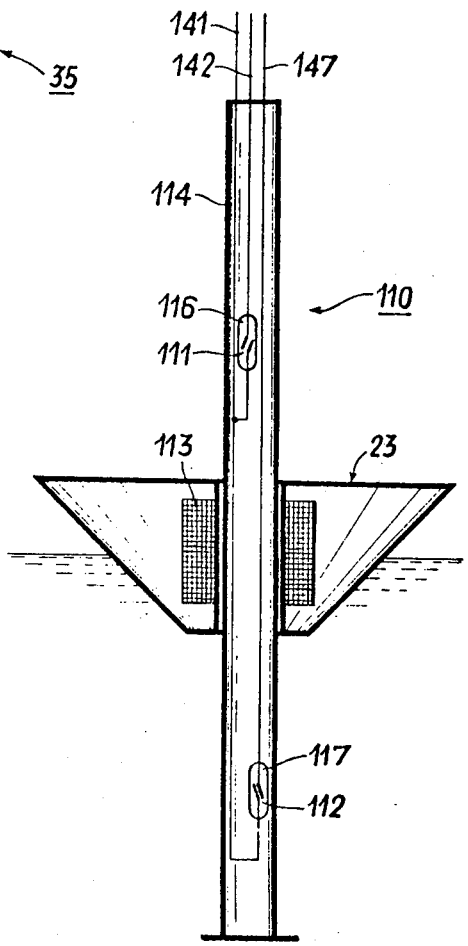

An embodiment of the float-controlled magnetic switch 110 diagrammatically indicated in FIG. 11 and used in the apparatus 105 will now be described more in detail and by way of example. The float-controlled magnetic switch 110 has an upright tubular housing 114, into which the leads 141, 142, and 147 extend through liquid-tight seals. The housing 114 contains two hollow glass capsules, which are filled with inert gas. The contacts 111 of the float-controlled magnetic switch are fused in the upper glass capsule 116 and close in response to the approach of the float 23 and of the annular magnet 113 in accordance with normal reed-switch operation. The contacts 111 open when the float 23 is in the position shown. The lower contacts 112 are fused in the lower glass capsule 117 and are closed when the float 23 is in the position shown in FIG. 11 and open only in response to the approach of the annular magnet 113.

Finally, it may be noted that the apparatus 105 diagrammatically shown in FIG. 8 may be analogous to the apparatus 45 of FIG. 7 in its external design and may be composed of analogous units.

Oil-polluted water was purified with the apparatus 45 shown in FIGS. 3, 4, 6 and 7. The feed samples had the compositions stated in Table I:

Table I

|  |  |  |
|---|---|---|
| Sample 1 | 25% SAE 30 oil | 75% fresh water |
| Sample 2 | 25% SAE 30 oil | 75% salt water |
| Sample 3 | 25% Diesel oil | 75% salt water |
| Sample 4 | 25% Diesel oil | 75% fresh water |
| Sample 5 | 25% Diesel oil | 75% fresh water. |

The oil content of the water samples which had passed through the apparatus was determined by an infrared-spectroscopic method by which the C-H valence viabrations of the oil were investigated By means of respective calibration curves for the SAE 30 oil and the Diesel oil, bands at 2950, 2920 and 2850 $cm^{-1}$ were detected. The contents of SAE 30 oil and Diesel oil stated in Table II were ascertained:

Table II

|  | Type of oil | Water: | Content (mg oil per liter of water) |
|---|---|---|---|
| Sample 1 | SAE 30 | fresh water | 2.0 |
| Sample 2 | SAE 30 | Salt water | 0.3 |
| Sample 3 | Diesel oil | salt water | 0.7 |
| Sample 4 | Diesel oil | fresh water | 0.7 |
| Sample 5 | Diesel oil | fresh water | 0.9 |

The filter which was used consisted of an open-pored synthetic-resin foam of cross-linked polyurethane having a specific gravity of 35 kilograms per cubic meter. The filter was 180 millimeters in diameter and had a height of 125 millimeters. The velocity of flow through the filter was 2.1 liters per minute for samples 1 and 2 pollutd with SAE 30 oil and 2.8 liters per minute for samples 3, 4, and 5 polluted with Diesel oil.

Figure 12:
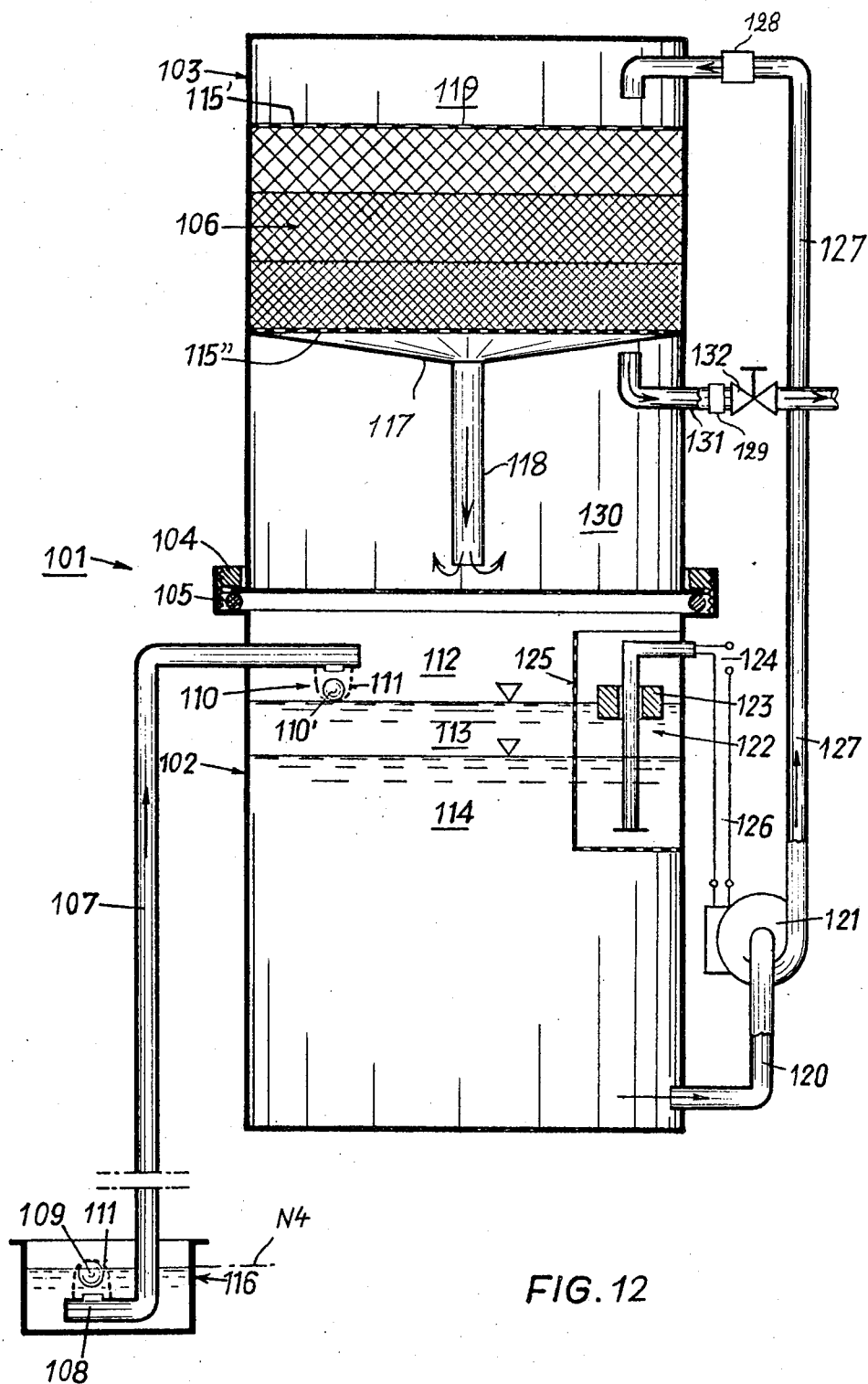
FIG. 12 is a vertical sectional view partly in diagrammatic form illustrating yet another purifying system according to this invention.

The arrangement shown in FIGS. 12 has a two-part housing 101 formed with an upper compensation chamber 103 housing a three-part filter 106 as described above and a lower separation chamber 102. Polluted water from a bilge 116 is aspirated through a tube 107 provided on its lower intake end with a check valve 108 having a ball 109 in a cage 111 serving to prevent fluid flow into the tube 107 when the floating ball 109 lies against the opening of the valve. Thus the system can only take on polluted water when the level of polluted water in the bilge 116 is above a level indicated at N4.

The upper output end of this tube 107 opens into a space 112 in the chamber 102 and is provided with a ball-tupe check valve 110 having a ball 110' held in a cage 111 and of a density such that it will float and prevent liquid flow out of the chamber 102 when the liquid level therein rises up to the end of tube 107.

A pump 121 has an intake or suction line 120 connected to the lower region of the chamber 102 so as to draw therefrom water 114 from which oil 113 has separated. The output or pressure line of this pump 121 is connected to an upper compartment in the chamber 103 above the filter 106. This pump is operated by a reed switch as described above held in a vertical tube 122 about which a magnetic doughnut float 123 is received and which is contained in a screen 125 which prevents particulate contaminants from fouling the tube 122.

The filter 106 is received between an upper screen 115' 115'' and a lower screen 115'' much as described above. A funnel 117 having a lower spout 118 which terminates at the bottom of the chamber 103 in the lower region of a compartment 130 conducts the filtered liquid to the bottom of this chamber so that any dense matter carried thereby will readily settle out. An outlet line 131 having a valve 132 serves to drain the filtered liquid from this compartment 130, this conduit 131 opening at the upper region of the compartment 130.

The upper housing part forming the compensation chamber 103 has a lower edge 104 threaded into the upper rim of the lower half 102 and squeezing an O-ring 105 which makes the compartment airtight and watertight. In addition a snap coupling 128 is provided on the pressure line 127 and another such snap coupling 129 on the line 131 so that the top half 103 can readily be removed and changed for another such unit containing a fresh filter 106. This system operates substantially like the systems described above.

We claim:
1. An apparatus for purifying a polluted liquid containing a liquid pollutant having a lower specific gravity than said polluted liquid, said apparatus comprising:
   a separating chamber;
   means for introducing said polluted liquid into the upper region of said separating chamber whereby said liquid undergoes therein a preseparation with said pollutant rising to the surface of said liquid;
   sensor means for detecting the liquid level in said separating chamber;
   a compensation chamber above said separating chamber having a filter above said sensor means subdividing said compensation chamber into an upper compartment and a lower compartment, said lower compartment being sealed from said separating chamber;
   a pump disposed at a level above the bottom of said separating chamber and below said compensation chamber, said pump having an intake side connected to the lower region of said separating chamber and an output side connected to said upper compartment for withdrawing said liquid from said separating chamber and introducing same into said chamber;
   a duct for drawing filtered liquid from said lower compartment;
   an inlet opening into said separating chamber for delivering said polluted liquid thereto, said inlet having a check valve only permitting liquid flow into said separating chamber; and
   control means connected to said sensor means for operating said pump only when said liquid level is above a predetermined level.

2. The apparatus defined in claim 1 wherein said compensation chamber is provided with a conduit extending from the lower side of said filter to the lower region of said lower compartment.

3. The apparatus defined in claim 2 wherein said conduit is formed as a funnel.

4. The apparatus defined in claim 3 wherein said sensor means includes a float in said separation chamber and a switch operatively connected to said float and to said pump.

5. The apparatus defined in claim 4 wherein said switch is a reed switch fixed in said sepration chamber at said predetermined level and said float is provided with a magnet.

6. The apparatus defined in claim 2 wherein said housing is generally cylindrical and said upper part is provided with a lower edge threadedly engageable with said lower part.

7. The apparatus defined in claim 2 wherein said liquid-draining means duct includes a valve for regulating fluid flow therethrough and thereby regulating fluid flow into said compensation chamber.

* * * * *